July 3, 1923.

F. A. SAUNDERS

VALVE ACTUATING MEANS

Filed Aug. 12, 1922

Inventor

Frank A. Saunders

By Watson E. Coleman
Attorney

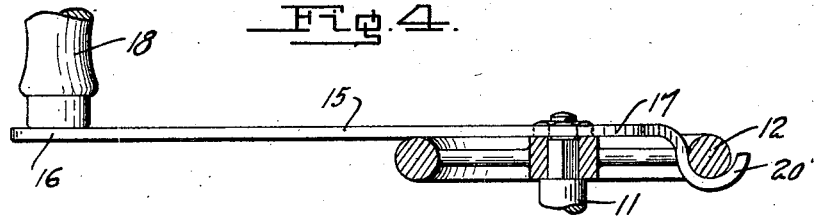
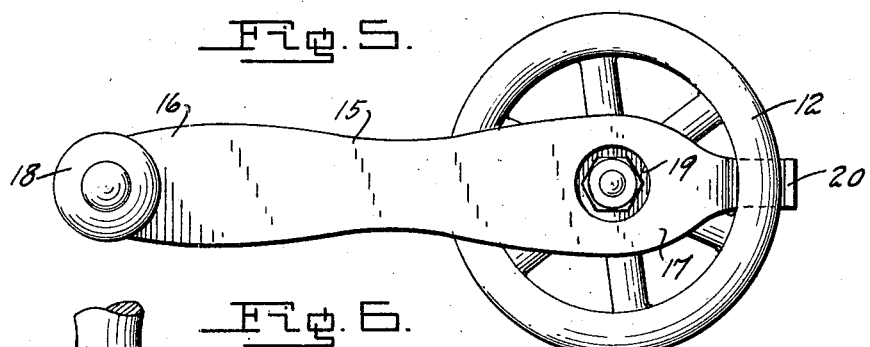
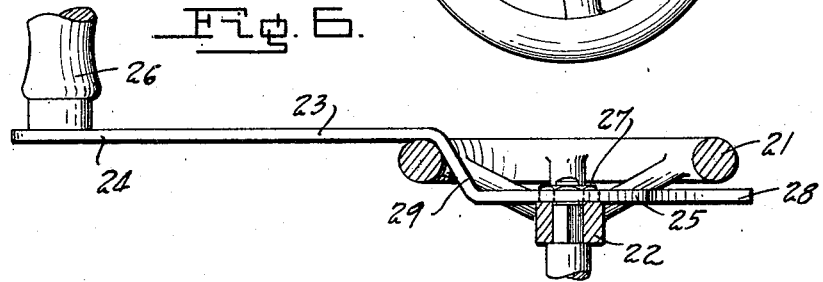
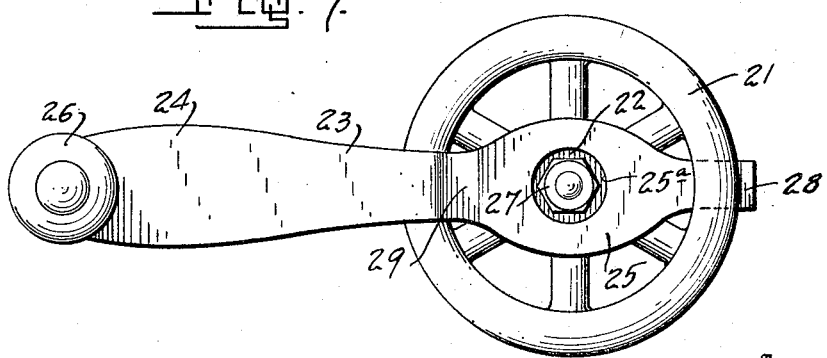

Patented July 3, 1923.

1,460,922

UNITED STATES PATENT OFFICE.

FRANK A. SAUNDERS, OF DUBUQUE, IOWA.

VALVE-ACTUATING MEANS.

Application filed August 12, 1922. Serial No. 581,539.

*To all whom it may concern:*

Be it known that I, FRANK A. SAUNDERS, a citizen of the United States, residing at Dubuque, in the county of Dubuque and State of Iowa, have invented certain new and useful Improvements in Valve-Actuating Means, of which the following is a specification, reference being had to the accompanying drawings.

This invention relates to a valve actuating device, and has for its object to provide a device of this character capable of producing the desired amount of leverage for actuating valves that are difficult to operate.

It is another object of the invention to provide a device of this character in the form of an attachment for use in connection with the various forms of valves, the valve stem of which is operated by a wheel handle.

It is a further object of the invention to provide a device of this character adapted to be attached to the wheel handle of a valve and extended a considerable distance from the valve to permit sufficient pressure to be applied to said device for actuating a valve without requiring unnecessary strain on the part of the operator, and without danger of damaging the valve.

It is still a further object of the invention to provide a device of this character which can be positioned at any point on the wheel handle of the valve, regardless of the position of the valve within the valve casing, and without the use of fastening means.

With these and other objects in view, the invention consists in the improved construction and arrangement of parts to be hereinafter more particularly described, fully claimed and illustrated in the accompanying drawings, in which:—

Figure 4 is a side elevation of another form of the device, showing the frame applied to a wheel handle;

Figure 5 is a top plan view of the structure shown in Figure 4;

Figure 6 is a side elevation of another form of the device; and

Figure 7 is a top plan view of the structure shown in Figure 6.

It is a well known fact that all types of valves, including globe, seat or gate valves, used in connection with steam, ammonia, air, water, or other fluid under pressure, must be rendered leak-proof and therefore must be tightly packed. Consequently, operation is difficult. These valves are only equipped with the ordinary type of wheel handle, which in view of the tight packing of the valve, are not sufficient to permit opening and closing of the valve without great strain on the part of the operator, in addition to requiring considerable time, and even then it is quite difficult to tightly close the valve.

This disadvantage is overcome by the provision of a novel form of valve actuating device in the form of a lever or shank which may be readily applied and removed from any type of valve using a wheel handle to permit the desired leverage and cause the valve to be quickly and properly actuated.

Figure 1:
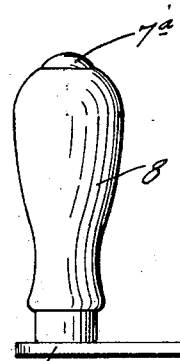
Figure 1 is a view in elevation of a valve actuating device constructed in accordance with an embodiment of the invention and shown applied to the wheel handle of a valve, the wheel handle being shown in section.
Figure 1:
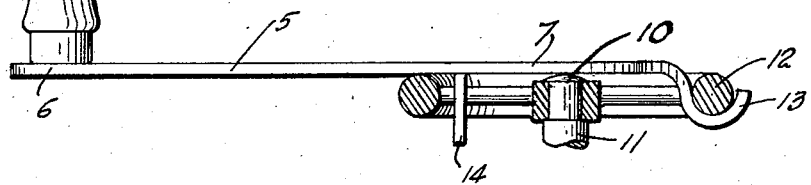
Figure 2:
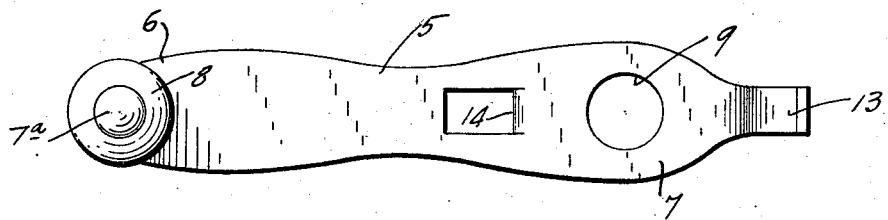
Figure 2 is a top plan view of the device.
Figure 3:
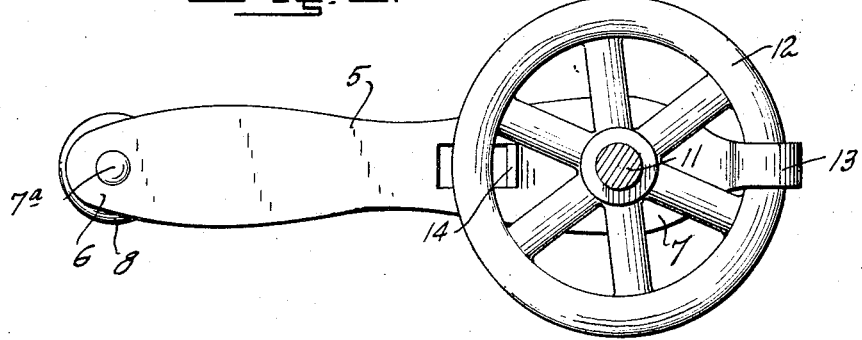
Figure 3 is a bottom plan view of the structure shown in Figure 1.

To accommodate the various types of valve handles, the device is made in several types. The type disclosed in Fig. 1 consists of a shank 5 which is relatively long, and has its end portions 6 and 7 enlarged, the end portion 6 being provided with an opening through which a bolt 7ª extends, a rotatable hand grip 8 being mounted on the bolt, by means of which the device is operated. The opposite end 7 is provided with a relatively large opening 9 adapted to receive the beaded end 10 of a valve stem 11, said valve stem being provided with a wheel handle 12, this type of wheel being flat, in other words, the hub of the wheel is disposed in the plane of the outer rim of the wheel. Projecting from the end portion 7 of the shank is an extension 13, said extension being substantially formed into a hook adapted to engage the rim of the wheel handle 12. A lug 14 is struck from the shank 5, to one side of the center of the shank and adjacent the opening 9, said lug being disposed at right angles to the shank and projecting in the direction of the hook. This lug is adapted to be positioned between the spokes of the wheel handle 12.

In the application of this form of the invention, the hook 13 is extended beneath the rim of the handle between the spokes thereof, while the beaded end 10 of the valve stem is permitted to enter the opening 9. The lug 14 is then positioned between the spokes remote from the portion of the wheel engaged by the hook. This permits a firm grip to be had upon the wheel handle, and as the hand grip 8 is disposed a considerable distance from the wheel handle, it is possible to operate the most difficult type of valve with ease and rapidity. It will be noted that no fastening means of any character are used to connect the shank to the wheel handle. In view of this, the shank may be applied to the handle 12, regardless of the position of the valve within the valve casing. It may be readily detached by simply moving the lever away from the valve handle so as to permit disengagement of the lug 14 from the handle 12.

In Figs. 4 and 5 another form of the invention is shown. This form, similar to the form just described, is intended for use in connection with a wheel handle of flat design, in other words, wherein the hub of the wheel is disposed substantially in the plane of the wheel. This form embodies a shank 15 having enlarged ends 16 and 17, the end 16 being provided with a handle 18 similar to the handle 8. The end portion 17 is provided with a relatively large opening 19 adapted to receive the securing nut of the wheel handle 12. It is of course obvious that the opening is not intended to engage the nut, similar to a wrench, but simply to serve as a recess for the nut so as to permit the shank to lie substantially parallel and closely adjacent the wheel handle 12. Projecting from the end portion 17 of the shank is an extension 20, said extension, similar to the extension 13, being formed into a hook. This form of the device is particularly adapted for use in connection with a valve, the parts of which are relatively large, in other words, wherein the hub member is relatively thick. The hook member 20 is made in accordance with the thickness of the hub so as to extend beneath and engage the rim of the wheel and permit the enlarged end portion 17 of the shank to engage the upper face of the hub. This form of the invention, similar to the form previously described, does not require any type of fastening means.

In Figs. 6 and 7 still another form of invention is shown. This form of the invention is intended for use in connection with a crown type of wheel handle 21, or wherein the hub portion 22 of the handle is offset with respect to the rim. This form embodies a shank 23 having enlarged end portions 24 and 25, the end portions 24 being provided with the usual rotatable handle 26, similar in construction to the handles 8 and 18. The end portion 25 is provided with a relatively large circular opening 26 adapted to receive the securing nut 27 of the wheel handle 21. Projecting from the end portion 25 is an extension 28, said extension being flat and disposed within the plane of the end portion 25. This extension is intended to extend between the hub and the rim of the wheel. The end portion 25 adjacent the opening 26 is offset as at 29 with respect to the body portion of the shank so as to permit the end portion 25 to enter the crown type of handle 21 and also permit the body portion of the handle to extend over the rim.

From the foregoing it will be readily seen that this invention provides a novel form of valve actuating device which may be applied to any type of valve using a round or wheel handle. The device is capable of attachment without the use of screws, or clamps. It is also applicable to a valve disposed in an obscure place, as it is possible to operate the valve similar to the movement of a ratchet lever, and the device may be easily and quickly applied to various points or portions of the wheel handle. In addition to this it provides a relatively long lever capable of being operated by anyone, without any unnecessary strain, regardless of the tightness of the valve.

It is of course obvious that my invention is susceptible of some change and modification without departing from the principle and spirit thereof, in view of the necessity of accommodating the device to various shapes of handles. For this reason I do not wish to be understood as limiting myself to the precise arrangement and formation of the device herein shown in carrying out my invention in practice; except as hereinafter claimed.

What is claimed is:—

1. Valve actuating means comprising a shank having an opening in one end thereof for the reception of the securing means of a valve handle, and an extension projecting from said end of the shank and arranged to engage the valve handle.

2. Valve actuating means comprising a shank having an opening in one end thereof arranged to receive a portion of a valve, an extension projecting from said end and arranged to engage a portion of the valve handle, that portion of the shank adjacent the opening and remote from the extension being arranged to engage the valve handle.

3. Valve actuating means comprising a shank having an opening in one end thereof, extensions projecting from said end adjacent the opening, said end portion of the shank being arranged to engage the handle of a valve, and a handle member carried by the opposite end of the shank.

4. Valve actuating means comprising a shank having an enlarged end portion, said end portion being provided with an opening, and an extension, said extension being arranged to engage the wheel handle of a valve, that portion of said end portion adjacent the opening and remote from said extension being arranged to engage the wheel handle of the valve, and a rotatable handle carried by the opposite end of the shank.

In testimony whereof I hereunto affix my signature.

FRANK A. SAUNDERS.